United States Patent Office 2,843,558
Patented July 15, 1958

2,843,558

COMPOSITIONS COMPRISING ACRYLONITRILE POLYMERS AND DIAMIDES

Yoshisato Fujisaki, Kochi-shi, Kochi-ken, and Hidehiko Kobayashi, Fukuokason, Ena-gun, Gifu-ken, Japan, assignors to Asahi Kasei Kogyo Kabushiki Kaisha, Kita-ku, Osaka, Japan, a corporation of Japan No Drawing. Application August 21, 1953
Serial No. 375,825

Claims priority, application Japan June 8, 1953

15 Claims. (Cl. 260—32.6)

This invention relates to a new composition of matter and articles produced therefrom. More particularly, this invention relates to an organic solvent solution of polymer of acrylonitrile i. e. polyacrylonitrile, and copolymers and interploymers of acrylonitrile in which at least 85% by weight of the polymer is acrylonitrile

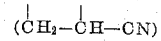

and to the production of shaped articles from said organic solvent solution of polymers of acrylonitrile.

Polyacrylonitrile, and copolymers and interpolymers of acrylonitrile with other polymerizable substances, for example vinyl or acrylic compounds, in which at least 85% by weight of the polymers is acrylonitrile have been well known and it is recognized that they have desirable physical and chemical properties including toughness and insolubility in and insensitivity to common organic solvents such as methyl or ethyl alcohol, acetone, ethyl ether, ethyl acetate, hydrocarbons, chlorinated hydrocarbons and the like. Because of these facts, numerous attempts have been made to form these polymeric materials into yarns, films and other shaped articles.

G. H. Latham (U. S. Patent No. 2,404,714) discloses solutions of polyacrylonitrile in dimethylcarbamyl compounds and the production of extruded and otherwise shaped articles and structures from such solutions. Said patent represents the first successful dissolution of polyacrylonitrile in a solvent to produce a solution which is suitable for the production of commercially useful textile yarns or wrapping tissue films and similar tough, flexible structures.

It has been known heretofore that concentrated aqueous solutions of inorganic salts such as lithium bromide, zinc chloride and sodium sulfocyanide will dissolve polyacrylonitrile. Besides, it has been proposed (Rein, U. S. Patent No. 2,140,921) to employ the resulting solutions in the formation of yarns and films. However, it has been found substantially impossible to use the resulting compositions in such a manner as disclosed in said U. S. patent. Their extrusion into coagulating baths of the type containing such nonsolvents for polyacrylonitrile as water, dilute acid, dilute salt solution, etc. results in the formation of shaped articles containing large amounts of the inorganic salt of the proposed solvent. These salts are then distributed throughout structures and thereby the continuity of the polyacrylonitrile phase is destroyed and the structures possess poor physical properties. Removal of these salts results in the formation of a porous, spongy, weak and undesirable structure that is very brittle and completely unsuitable for a yarn or film. Moreover, when it is attempted to form a multifilament yarn by extruding, for example, the proposed aqueous sodium sulfocyanide polyacrylonitrile composition into a dilute acid bath, it is found that the individual filaments obtained stick together to form an essentially monofilament structure that is extremely brittle and cannot be bent or worked without breaking.

U. S. Patents 2,404,713 to 2,404,728 disclose that various organic compounds can be used as solvents for polymers of acrylonitrile and that solutions of these polymers can be spun to fibers which do not possess the undesirable properties resulting from the use of inorganic salts.

The present invention relates to a satisfactory dissolution of polymers of acrylonitrile in an organic solvent or solvents taken from a new class of organic compounds that has never been proposed. The polymer solutions produced thereby are extremely satisfactory for the production of tough, flexible, dense, colorless yarns and films which are suitable for practically all general commercial applications of such products.

It is therefore an object of this invention to provide new solvents for polyacrylonitrile, or a copolymer or interpolymer of acrylonitrile in which at least 85% by weight of the polymer is acrylonitrile, which do not react with or decompose the polymer and which may be substantially and completely removed with ease from the structures formed of a solution obtained from dissolving said polymers in the solvents.

It is another object of this invention to produce a solution of polyacrylonitrile, or a copolymer or interpolymer of acrylonitrile in which at least 85% by weight of the polymer is acrylonitrile in the new solvents, the solution being suitable for the formation of commercially useful, void free articles, for example yarns which are suitable for textile yarns and films which are suitable for wrapping tissue.

It is another object of this invention to produce a solution of polyacrylonitrile, or a copolymer or interpolymer of acrylonitrile in which at least 85% by weight of the polymer is acrylonitrile in the new organic solvents, said solution being stable over extended period of time and eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles or structures of polyacrylontrile, or copolymers or inter-polymers of acrylonitrile in which at least 85% by weight of the polymers is acrylonitrile.

It is still another object of this invention to produce shaped articles or structures of polyacrylonitrile, or copolymers or inter-polymers of acrylonitrile in which at least 85% by weight of the polymer is acrylonitrile, for example yarns, films, tubes, bristles and the like which are tough, flexible, tenacious and free from voids.

Other objects of the invention will appear hereinafter.

The objects of the invention may be accomplished in general by dissolving polyacrylonitrile, or copolymers or inter-polymers of acrylonitrile in which at least 85% by weight of the polymer is acrylonitrile in a solvent which contains at least 80% by weight of one or more of the following compounds:

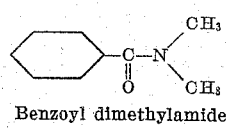

Benzoyl dimethylamide

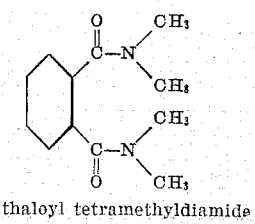

Phthaloyl tetramethyldiamide

Other compounds which may be mixable at room temperature with above-mentioned solvents are inorganic or organic non-solvents for the polymer such as, for example, water, phenol, formic acid, ethylenecyanhydrine and ethylenechlorhydrine, etc. And the percentage of the latter in the mixed solvent must be at most 20%.

The following examples, in which parts, proportions and percentage are given by weight unless otherwise defined, illustrate applications of the principle of the invention, but are not to be construed as limiting the same.

Example 1

15 parts of polyacrylonitrile having an average molecular weight of 150,000 were ground to an average particle size of 200 mesh and intimately mixed with 85 parts of benzoyldimethylamide. The mixture was then heated over a period of 15 minutes at a temperature of 100° C. to form a clear and viscous solution. The resulting clear solution was extruded through a spinneret into a bath comprising glycerine heated at 120° C. to form polyacrylonitrile synthetic fiber having a stretching strength of 3.8 grams/denier.

The polyacrylonitrile used in this and following examples was prepared by polymerization of monomeric acrylonitrile dissolved or emulsified in water, in the presence of a catalyser of ammonium persulfate. The polymer preferably possesses a molecular weight within the range of from 10,000 to 300,000 or higher, calculated from viscosity measurement by the Staudinger equation:

$$[\eta] = K_m M$$

wherein $K_m$ equals to $1.5 \times 10^{-4}$ and $[\eta]$ is $(\eta_{sp}/c)_{c=0}$, that is, intrinsic viscosity. Acrylonitrile copolymers or interpolymers containing at least 85% by weight of acrylonitrile, preferably having a molecular weight of from 10,000 to 300,000 or higher, can be prepared in a similar manner.

Example 2

15 parts of polyacrylonitrile having an average molecular weight of 150,000 was ground to an average particle size of 200 mesh and intimately mixed with 85 parts of phthaloyl tetramethyldiamide, the mixture then was heated for 10 minutes to a temperature of 100° C. to form a clear and viscous solution. The resulting clear solution was extruded through a spinneret into a bath comprising diethylphthalate heated at 110° C. to form a coagulum. This coagulum is transformed and stretched 5 times into polyacrylonitrile synthetic fibers having a strength of 3.2 grams/denier.

Although the invention is preferably applied to the preparation of solutions of polyacrylonitrile, it may be also applied for dissolving copolymers and interpolymers in which acrylonitrile is copolymerized or interpolymerized with other polymerizable substances such as, for example, compounds containing one or more of ethylenic linkages including vinyl or acrylic compounds such as vinyl acetate, vinyl chloride, vinylidene chloride and homolouges as well as olefinic or diolefinic hydrocarbons such as styrene, isobutylene and butadiene and polymers of such substances. The solvents of this invention are eminently satisfactory for use with those polymers which contain a large amount e. g. at least 85% by weight, of acrylonitrile, and have generally been regarded by the art as being completely insoluble in all common organic solvents. Use of these solvents is not limited to acrylonitrile polymers of any given molecular weight, preferably satisfactory for those polymers having an average molecular weight within the range of from 10,000 to 300,000 calculated from viscosities by the Staudinger's equation. These solvents render the polymers suitable for use in the manufacture of yarns or films.

The solutions are prepared by dissolving the polyacrylonitrile or inter-polymer of acrylonitrile with one of the above-mentioned solvents, or a mixture thereof or a mixture of the above-mentioned solvent or solvents and any of other compounds elected from the inorganic or organic non-solvent for polymer at room temperature such as water, phenol, formic, acid, ethylenecyanhydrine and ethylenchlorhydrine, etc.

The solution of acrylonitrile polymer dissolved in the organic solvent in accordance with this invention must be of such a concentration that its viscosity at the operating temperature is within a workable range. For example, the solution should preferably have a viscosity within the range of 25 to 750 poises in order to make it suitable for spinning to form yarns or casting to films. When the polymer has a molecular weight of 250,000 or more, it is required that the maximum concentration of polymer in the spinning solution is of the order of 10%. Generally, it is preferred that the spinning solution contains at least 10% of the polymer, because of the difficulty of rapidly removing large amounts of solvent from the solution in the spinning operation. Moreover, it is undesirable from an economical point of view to use such large amounts of solvent for the spinning of a given amount of polymer, although it is true that the solvent will be completely recovered from the spinning operation and reused. For these reasons, it is preferred to employ a polymer having an average molecular weight of from 30,000 to 100,000 since such a polymer forms a solution having the desired viscosity at a concentration of the order of 14% to 25% and at a desirable spinning temperature of the order of 100° to 150° C. It is within the scope of this invention to heat the solution to a higher temperature, even to above the normal boiling point of the solvent, for the actual spinning operation.

With reference to acrylonitrile-polymers, and copolymers and inter-polymers of acrylonitrile containing at least 85% by weight of acrylonitrile, throughout the specification and claims, the acrylonitrile unit is considered to be present in the polymer molecule in the form of

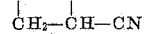

Since it is obvious that many changes and modification can be made in the above described details without departing from the nature and spirit of the invention, it is to be understood that the invention is not to be limited to the details described herein except as set forth in the appended claims.

What we claim is:

1. A new composition of matter comprising a polymer of acrylonitrile containing in the polymer molecule at least 85% by weight of acrylonitrile and a compound taken from the class consisting of benzoyl dimethylamide and phthaloyl tetramethyldiamide.

2. A composition according to claim 1 wherein the polymer of acrylonitrile is copolymer of acrylonitrile and other polymerizable substances selected from the group consisting of vinyl acetate, vinyl chloride, vinylidene chloride, styrene, isobutylene, and butadiene.

3. A new composition of matter comprising a polymer of acrylonitrile containing in the polymer molecule at least 85% by weight of acrylonitrile and a solvent system containing at least 80% by weight of a compound taken from the class consisting of benzoyl dimethylamide and phthaloyl tetramethyldiamide.

4. As a new composition of matter, a polymer of acrylonitrile containing in the polymer molecule at least 85% by weight of acrylonitrile dissolved in a compound taken from the class consisting of benzoyl dimethylamide and phthaloyl tetramethyldiamide at a temperature of at least 100° C.

5. A composition of claim 4 characterized in that the polymer has a molecular weight of between 10,000 and 300,000.

6. A composition of claim 4 characterized in that the polymer has a molecular weight of between 30,000 and 150,000.

7. A composition of claim 4 characterized in that the solution has a viscosity within the range of 25 to 750 poises.

8. A composition of claim 4 characterized in that the solution contains at least 10% of the polymer.

9. As a new composition of matter, a polymer of acrylonitrile containing in the polymer molecule at least 85% by weight of acrylonitrile dissolved in a solvent system containing at least 80% by weight of a compound taken from the class consisting of benzoyl dimethylamide and phthaloyl tetramethyldiamide at a temperature of at least 100° C.

10. A composition of claim 9 characterized in that the polymer has a molecular weight of between 10,000 and 300,000.

11. A composition of claim 9 characterized in that the polymer has a molecular weight of between 30,000 and 150,000.

12. A composition of claim 9 characterized in that the solution has a viscosity within the range of 25 to 750 poises.

13. A composition of claim 9 characterized in that the solution contains at least 10% of the polymer.

14. As a new composition of matter, polyacrylonitrile dissolved in a compound taken from the class consisting of benzoyl dimethylamide and phthaloyl tetramethyldiamide.

15. As a new composition of matter, polyacrylonitrile dissolved in a solvent system containing at least 80% by weight of a compound taken from the class consisting of benzoyl dimethylamide and phthaloyl tetramethyldiamide.

References Cited in the file of this patent

UNITED STATES PATENTS

| | | |
|---|---|---|
| 2,460,578 | Houtz | Feb. 1, 1949 |
| 2,684,281 | Lincoln | July 20, 1954 |

FOREIGN PATENTS

| | | |
|---|---|---|
| 905,695 | France | Dec. 11, 1945 |